Dec. 25, 1928.
G. SPIESS
1,696,215
APPARATUS FOR REMOVING SHEETS FROM A PILE
Filed May 28, 1927      7 Sheets-Sheet 1
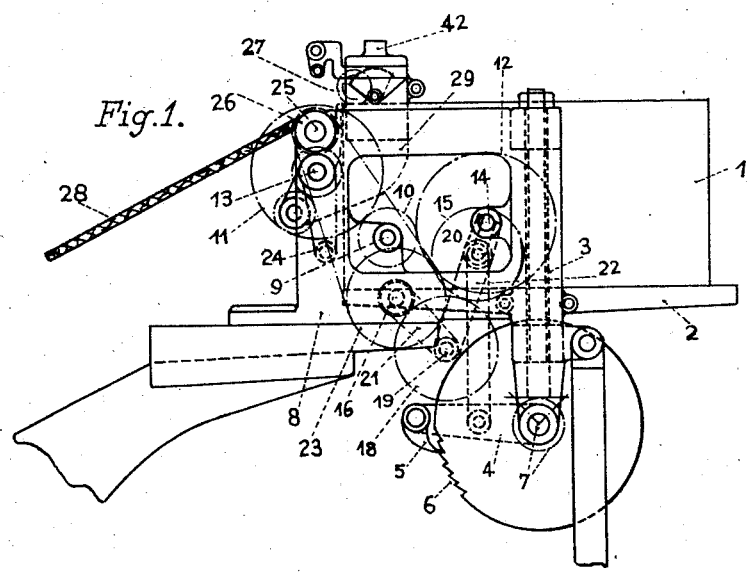
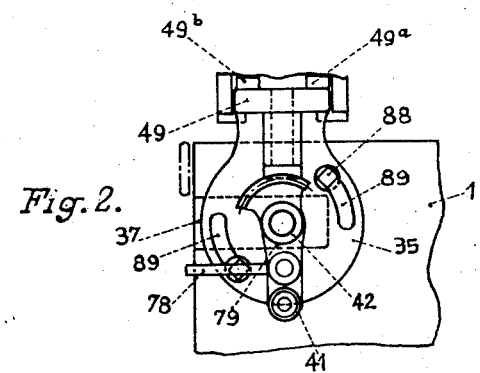
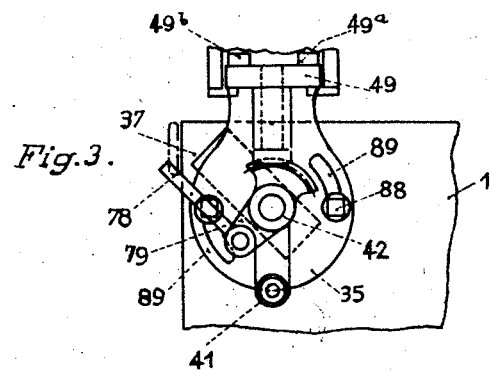
INVENTOR:
Georg Spiess
BY Paul E. Schilling
ATTORNEY.

Dec. 25, 1928.  1,696,215
G. SPIESS
APPARATUS FOR REMOVING SHEETS FROM A PILE
Filed May 28, 1927   7 Sheets-Sheet 2
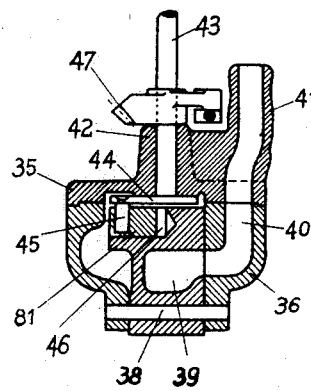
Fig. 6.
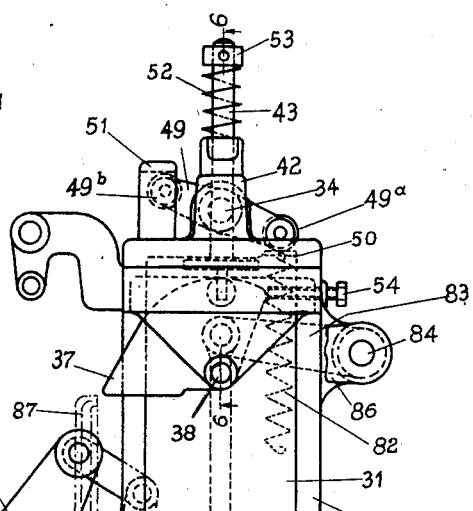
Fig. 4.
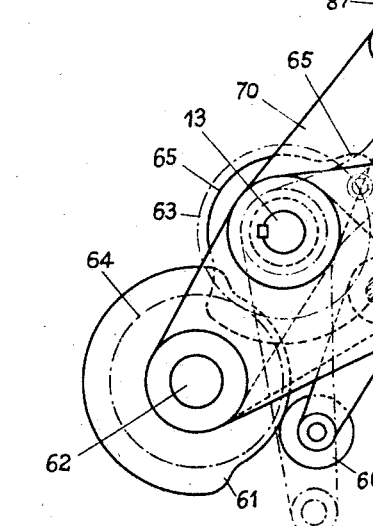
INVENTOR:
Georg Spiess
BY Paul E. Schilling
ATTORNEY.

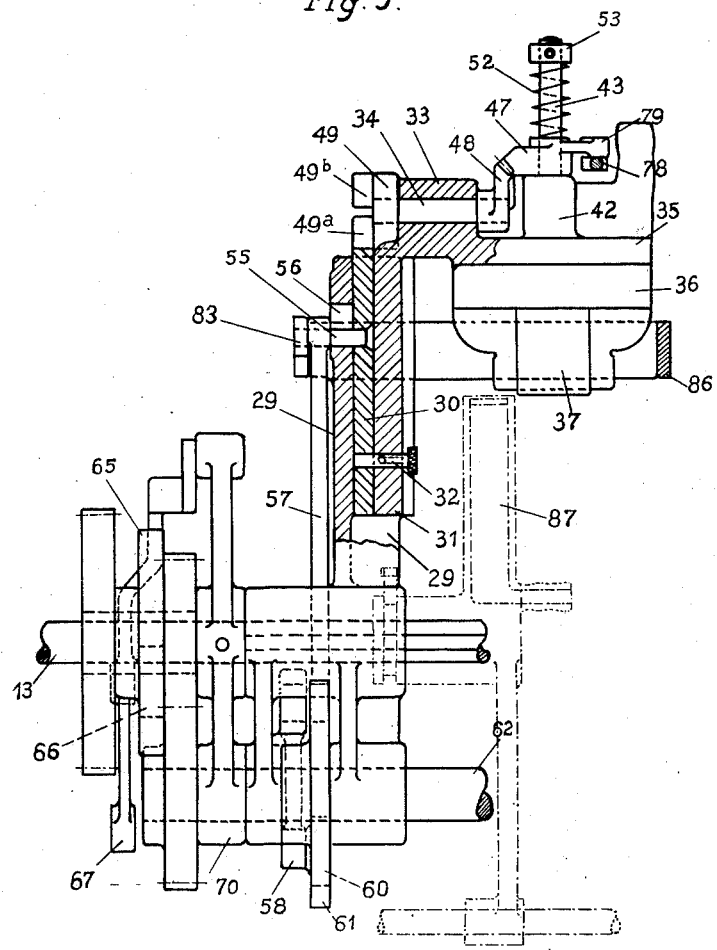

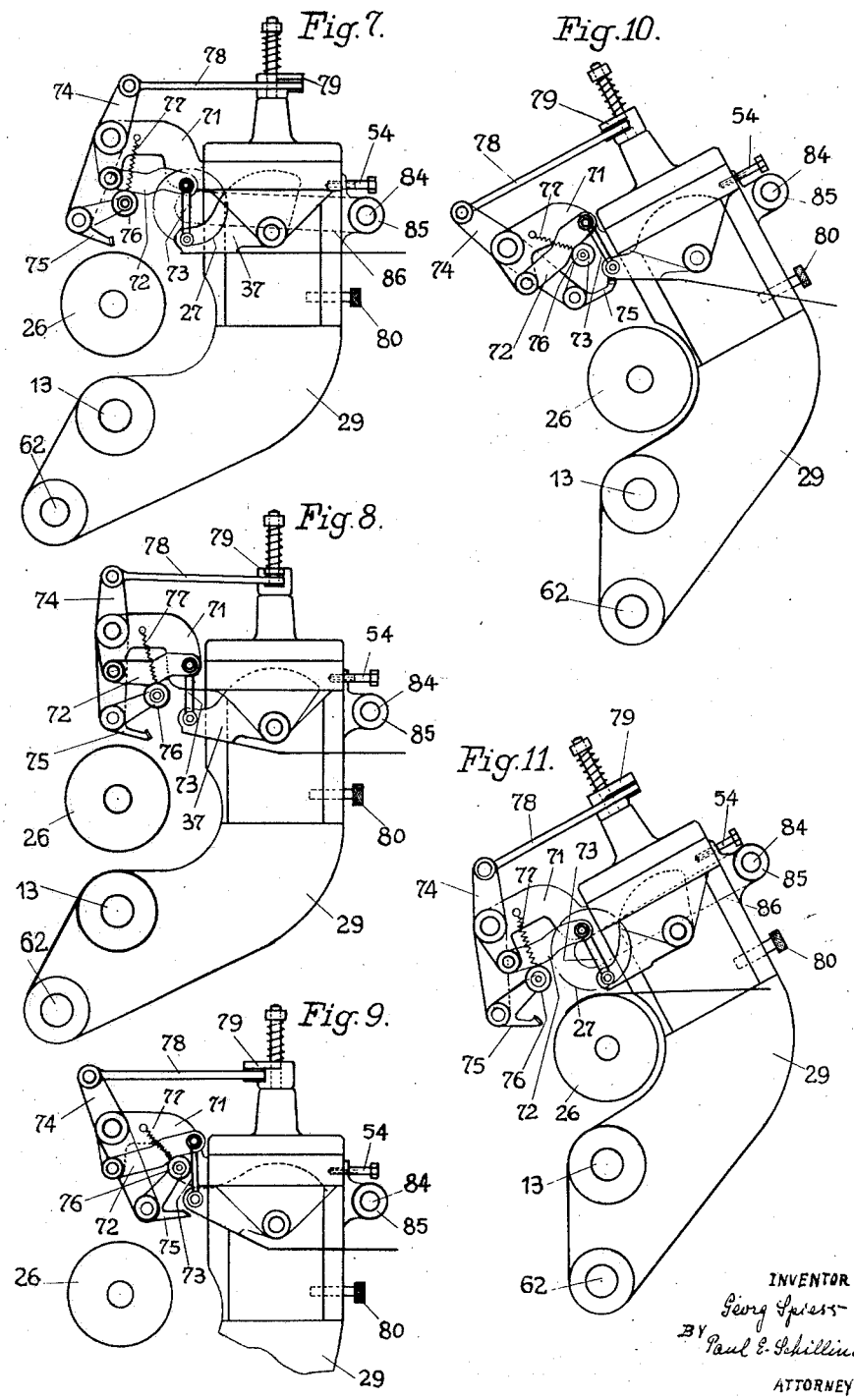

Dec. 25, 1928.
G. SPIESS
1,696,215
APPARATUS FOR REMOVING SHEETS FROM A PILE
Filed May 28, 1927   7 Sheets-Sheet 5
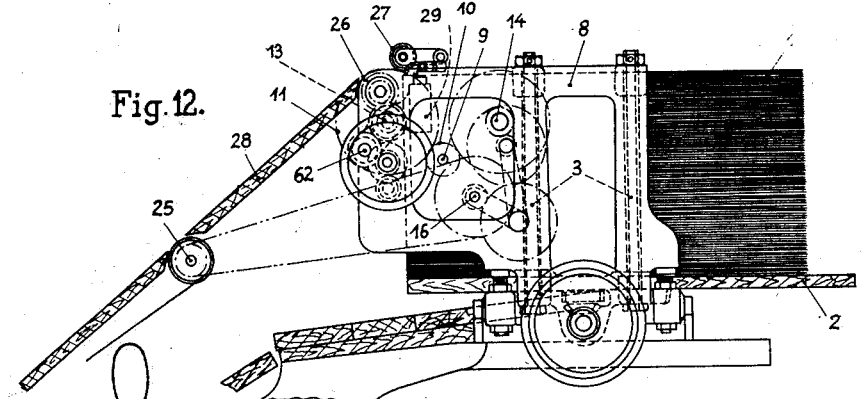
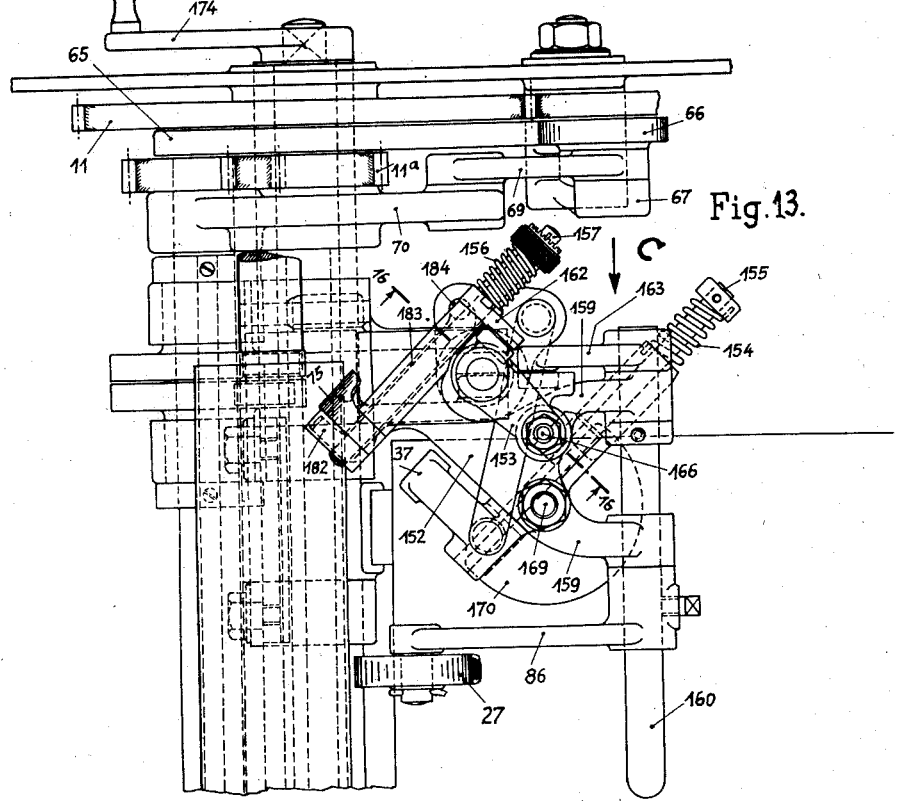
INVENTOR:
Georg Spiess
BY
Paul E. Schilling
ATTORNEY.

Dec. 25, 1928.

G. SPIESS 1,696,215

APPARATUS FOR REMOVING SHEETS FROM A PILE

Filed May 28, 1927 7 Sheets-Sheet 6

INVENTOR:
Georg Spiess
BY Paul E. Schilling
ATTORNEY.

Dec. 25, 1928. 1,696,215

G. SPIESS

APPARATUS FOR REMOVING SHEETS FROM A PILE

Filed May 28, 1927

Patented Dec. 25, 1928.

1,696,215

UNITED STATES PATENT OFFICE.

GEORG SPIESS, OF LEIPZIG-PLAGWITZ, GERMANY.

APPARATUS FOR REMOVING SHEETS FROM A PILE.

Application filed May 28, 1927, Serial No. 195,094, and in Germany May 27, 1926.

The invention relates to an apparatus for removing sheets from a pile, the apparatus being of the kind in which suction is used.

According to the invention the suction devices are carried by pivoted arms which are transversely adjustable on both sides of the pile, and these devices grip the front edge of the sheet, and pull it off the pile by means of a rocking movement. The suction devices co-act with grippers arranged on the arms, the grippers seizing the front corners of the sheet after it has been raised. By this method of using the suction devices the resistance of the sheet to being lifted from the pile is reduced, and the work of the suckers is facilitated. The suckers can be operated with less power, so that there is less risk of sucking up several sheets together. The suckers may first bend the sheet edges and then lift them, or may lift the sheet edges flat from the pile. The suckers may be rotatable about a vertical axis so that they can be adjusted to any required angle in relation to the front edges of the sheets. The invention consists further in the arrangement and effect of the device which will result from the following specification.

Two embodiments of the invention are shown, by way of example, in the accompanying drawing.

Figs. 1–11 illustrate the one embodiment and Figs. 12–17 the other embodiment of the invention.

Fig. 1 is an elevation of the apparatus.

Figs. 2 and 3 respectively show in plan view two positions of the suckers in relation to the pile.

Figs. 4 and 5 show on an enlarged scale two elevations, at right angles to one another, of the sucker lever and the members which it carries adjusted for one mode of operation.

Fig. 6 is a section on the line 6—6 of Fig. 4.

Figs. 7 to 11 illustrate the co-operation of the sucker and gripper by showing these parts in various positions, adjusted for another mode of operation.

Fig. 12 shows in elevation the total arrangement according to the second form of construction.

Figure 15:
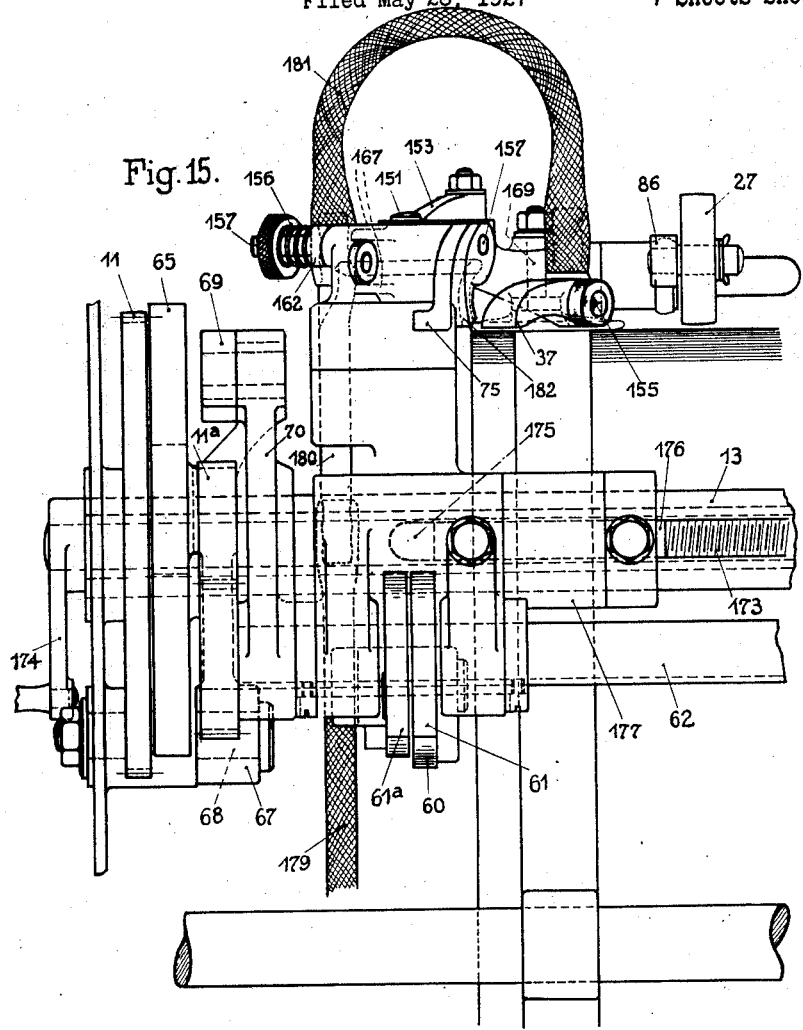
Figure 14:
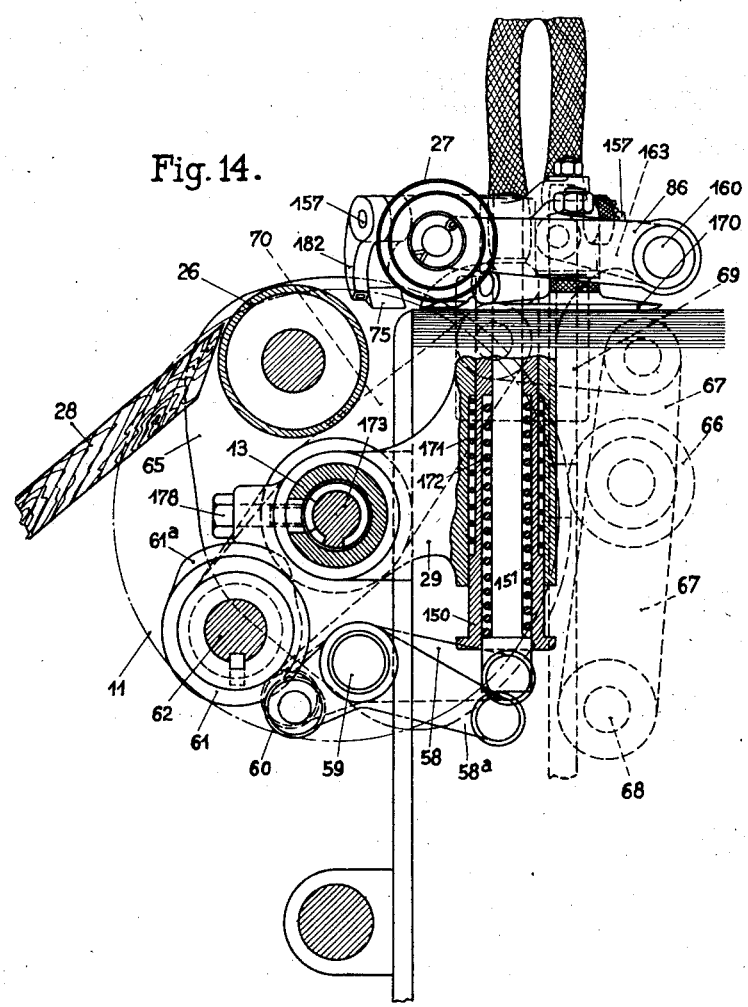

Figs. 13, 14 and 15 show each on larger scale respectively in top plan view, front elevation and side elevation a sucker, certain parts in Fig. 14 being shown in section.

Figure 16:
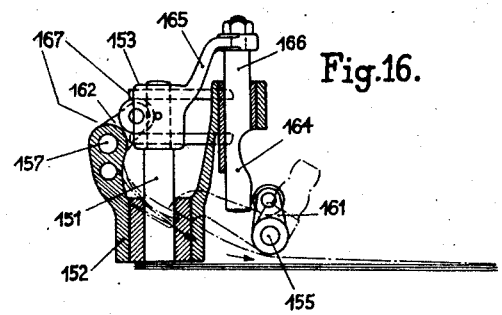

Fig. 16 is a section on line 16—16 of Fig. 13.

Figure 17:
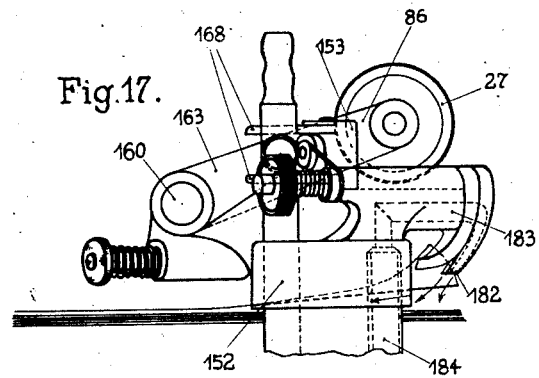

Fig. 17 shows in elevation the sheet separating mechanism viewed in the direction of the arrow line C in Fig. 13.

A table 2 for the reception of the pile of sheets 1 is vertically adjustable by means of screw spindles 3. The screw spindles are rotated in known manner by means of a lever 4, pawl 5, ratchet wheel 6 and bevel gears 7. Two shafts 13, 14 mounted in the frame 8 are driven by means of a shaft 9 and a toothed wheel 10, which engages two toothed wheels 11, 12. A shaft 16 is driven by the shaft 14 with varying speed by means of a gear of a known kind, so that in the course of one revolution of the shaft 14 the shaft 16 is driven alternately with increasing and decreasing speed. This gear consists of a toothed wheel 15 fixed eccentrically to the toothed wheel 12 by means of a pivot 20, a toothed wheel 17 on the shaft 16, and a toothed wheel 18 engaged with the wheels 15, 17, the said wheel 18 being rotatable on the pivot 19 of a pair of links 21, 22 connecting the pivot 20 of the wheel 15 and the shaft 16. A shaft 25 is driven by the shaft 16 by means of a sprocket wheel 23 and chain 24; on the said shaft 25 there are rollers 26, which in co-operation with wiping rollers 27 transfer the sheets separated from the pile to a table 28, for example the feed table of a printing press.

The shafts 14 and 13 each make one revolution for each sheet fed from the pile.

On the shaft 13, at each side of the pile, there is a double armed lever 29 having a curved upwardly directed arm of a U-shaped cross section at the top, forming a guide for two slides 30, 31, which can be coupled together by means of a bolt 32. The slide 31 has an eye 33, with its axis parallel to the shaft 13, and in this eye a short shaft 34 is journalled. The eye 33 has an extension 35 to the underside of which a box-like member 36 is fixed, in which a sucker 37 is mounted on a pivot 38. The sucker projects with its mouthpiece out of its casing. The cavity 39 of the sucker is connected through a lateral slot with a channel 40 in one side wall of the casing 36, the said channel communicating with a union 41 for connection with the suction conduit.

In the extension 35 or in the bearing 42 of the same there is mounted a vertical shaft 43, which has on its lower end a disk 44 with a catch 45. The latter engages a cylindrical slide 81, which moves in a guide 46 on the back of the sucker.

Above the bearing 42 a segmental bevel wheel 47 is disposed on the vertical shaft 43, and is elastically connected with the shaft 43 by means of a torsion spring 52 and an adjustable collar 53; this bevel wheel engages a segmental bevel wheel 48 on the shaft 34. A double-armed lever 49 is also disposed on the shaft 34, and carries two rollers 49ª and 49ᵇ, one of which co-acts with an abutment 50 fixed on the upper end of the slide 30, and the other co-acts with an angular abutment 51 on the lever 29.

To the disk 30 a pin 55 is fixed, which projects through a slot 56 in the lever 29 and is connected to one arm of a bell crank lever 58 by a rod 57. The lever 58 rotates about a pivot 59 fixed to the lever 29. The other arm of the lever 58 rests by means of a roller 60 on a cam 61, which is rotatable at 62 on the end of the short downwardly directed arm of the lever 29, and is driven by the shaft 13 and a pair of toothed wheels 63, 64. Contact between the cam 61 and the roller 60 is maintained by the weight of the slide 30, and a spring 52. The cam imparts in the course of one revolution one downward and one upward movement to the slide 30. In the lowermost position of the sucker the parts assume approximately the position shown in Figs. 4 and 5, in which the mouthpiece of the sucker 37 rests on the pile, with resilient pressure due to the torsion spring 52, and the sheet edge is sucked. If the slide 31 is not coupled to the slide 30 by the pin 32, but is fixed by means of a set screw 80 in the lever 29 (Figs. 7 to 11), its abutment 50 strikes the roller 49ª during the upward movement of the slide 30, and thereby effects rotation of the lever 49 and the shaft 34, which is transmitted to the vertical shaft 43 by the toothed wheel segments 48, 47. The movement of the shaft 43 effects a backward rotation of the sucker 37 by means of the disk 44, catch 45 and the slide 81, whereby the sucked sheet is bent upwards (Fig. 8).

The sucker casing 35 has a U-shaped forward extension 71, to whose downwardly directed outer end a curved bar 72 is connected, the said bar being connected at its other end to the projecting end of the sucker 37, by means of a rod 73. A double-armed lever 74 is pivotally connected to the extension 71 and has an angular gripper 75 pivotally connected to its lower end. The arm of the gripper, which is provided with a roller 76, serves as a controlling arm and its roller travels on the bar 72, against which it is held by a spring 77. The other arm of the gripper carrier 74 is connected by means of a rod 78 to a projecting eye 79 on the hub of the bevel wheel segment 47.

The movement of the bevel wheel segment 47 whereby the sucker 37 with the sucked-up sheet edge is deflected in the manner described, at the same time effects by means of the lever 79, rod 78 and gripper carrier 74, a movement of the gripper 75 towards the sucker 37, whereby the guide roller 76 rolls along the bar 72. At the same time, by reason of the previously described backward rotation of the sucker 37 in its casing (Fig. 8), the bar 72 is moved upwards, so that the gripper 75 swings upwardly, when the roller 76 passes over a curved incline provided on the bar 72, the gripper end, which has in the meantime moved below the front end of the sucker, is drawn by the spring 77 against the underside of the sucker, so that the sheet is held on the sucker by the gripper 75, when the suction ceases (Fig. 9).

On the shaft 13 there is a cam 65, one whose circumference travels a roller 66, which is carried by a pivoted lever 67 pivoted at 68 to the machine frame. The free end of the lever 67 is connected to a double-armed lever 70 by means of a link 69, the lever 70 being loose on the shaft 13 and being pivotally connected at the end of its other arm to the lower arm of the lever 29 by means of the shaft 62. As the cam 65 rotates it effects an outward throw of the lever 70, whereby the lever 29 connected to the latter is swung out about the shaft 13 in the direction of the feed band rollers 26, that is to the left of Figs. 4, 5 and 7 to 11. This swinging movement of the lever 29 occurs after the gripper 75 has clamped the lifted sheet edge against the sucker.

The sheet is pulled from the pile by the movement of the lever 29 (Fig. 10). In the end position the sheet edge firmly clamped against the sucker is situated above the rollers 26.

During the downward passage of the slide 30, which now commences, the relaxation of the spring 52 effects a backward rotation of the vertical shaft 43, whereby the gripper 75 is withdrawn from the sucker 37 and swung back by means of the lever 79, rod 78 and gripper carrier 74, so that the sheet can fall on to the rollers 26. At the same time the sucker is again swung out of its casing by the action of the disk 44, catch 45 and slide 46, whereby the sheet is also moved in the direction of the pulling rollers 26. The lever 49 follows the downwardly travelling abutment 50 of the slide 30 with its roller 49ª, under the action of the spring 52.

A lever arm 83 is pivotally connected at one end to the pin 55 which connects the slide 30 with its push rod 57, and is arranged on a shaft 84 mounted in a bearing on the lever 29. The other end of this shaft carries a lever arm 86. The arm 86 carries a roller 27 and is of such length that in the forward position of the lever 29 it is above the rollers 26.

After the sheet has been released by the suckers and the front edge of the sheet rests on the rollers 26 the lever 29 swings back to its original position (Fig. 4).

When the slides 30, 31 are coupled together by the pin 32, and the set screw 80 is unscrewed, the series of movements is different from that just described, in that the slides first move upwardly together and then the impact of the roller 49$^b$ on the fixed angular abutment 51 starts the rotation of the shaft 34, as previously described. The shaft 43 takes no part in this rotation because the sucker 37 is held fast by a set screw 54 in a guide wall of the lever 29, which has been previously screwed in. The rotation of the bevel wheel segment 47 is therefore taken up by the spring 52. The mode of action is otherwise the same as that previously described, except that the sucker 37 does not perform any rotation about its bearing axis.

Blowers may be provided in known manner for the separation of the uppermost sheet, after it has been lifted, by means of an air blast directed between the said sheet and the sheet beneath it. The blower 87 is in the form of a lever on the shaft 13 and is fixed at its lower end to a fixed member on the machine frame, so that it remains at rest during the outward throw of the sucker lever 29 and delivers the blast during this period.

The sucker casing 36, with all the parts fixed thereto, including the shaft 43 and the bevel wheel segment 47, is adjustable about a vertical axis, in relation to the extension 35, and is fixed to the latter by means of bolts 88 which pass through curved slots 89 in the extension 35. By rotating the sucker casing 36 in relation to the extension 35 the position of the sucker 37 can be regulated as desired in relation to the sheet edges.

The form of construction shown in Figs. 12-17 differs from the above described form of construction in that the elements co-acting in the removing of the sheet from the pile, i. e. the sucker and the gripper as well as the press roller which presses the sheet, which has been pulled forward, onto the conveying rollers for conveying the same, are arranged on a slide adapted to move up and down and are controlled individually by a second control slide operated separately. This slide with the devices for removing the sheet from the pile is controlled, on the one hand, by a control cam and, on the other hand, by a spring acting in opposite direction to said control cam, or by its own weight, and it has a feeler foot adjustable in vertical direction and which, under the action of the spring or of the weight of the slide, is lowered upon the pile and regulates thereby the sucking position of the sucker with regard to the pile surface, so that this position is always the same when it has once been adjusted. The control element for the sucker and the separating devices co-acting with the same are also shiftable in opposition to the pressure of the spring by the action of a driving cam, the initial position with regard to the slide, which carries the sheet removing devices controlled by it, being determined by stops. The up and down moving carriers of the sheet removing devices and of the control head for controlling said devices are guided as co-axial slides in the rocking arms which, by their rocking movement, pull the sheet from the pile. The rocking arms are shiftable on a hollow shaft, on which they are adjustable by an adjusting spindle mounted in the hollow shaft.

In the Figs. 12 to 17 the elements mentioned already in the description of the first form of construction are designated by similar reference numerals. The driving shaft 25 of the conveying bands of the conveying table, said shaft being driven with acceleration and retardation, is not arranged directly on the upper end of said conveying table but slightly below this upper end.

In the curved and upwardly extending main arm of the locking levers 29, which, together with the spur wheel 11, are mounted on the hollow shaft 13, a slide sleeve 150 and a slide rod 151 are co-axially guided, the slide sleeve carrying at its upper end projecting from the lever 29 a head piece 152 with the sucker 37, the gripper 75 and a roller arm 86 effecting the conveying of the sheets removed from the pile, while on the upper end of the slide rod 151 a control head 153 for controlling the said elements is arranged. Upon the lower end of the slide sleeve 150 acts the one arm of the above described elbow-lever 58 which oscillates around a pin 59, fixed in the lever 29 in said arm carrying a roller, the other arm of said elbow lever and which carries a roller 60 being controlled by a cam disk 61 which is mounted upon a shaft 62 journalled in the downward directed arms of the lever 29 and is driven by means of a pair of spur wheels one of which spur wheels is rigid with the spur wheel 11. The shifting rod 151 is controlled in a similar manner by means of a second elbow lever 58$^a$ mounted on bolt 59 from a cam 61$^a$ on shaft 62. The oscillating movement of the lever 29 is controlled by the cam disk 65 rigidly connected with the toothed wheel 11 and by means of a lever 67 having a roller 66 and hingedly mounted on the machine frame at point 68. This lever 67 is connected by a link 69 to a two-armed lever 70 loosely mounted on shaft 13 and connected by bolt 62 to said lever 29.

On the upper end of the slide sleeve 150 projecting from the lever 29 a head piece 152 is fixed in which a shaft 155 of the sucker 37, controlled by a torsion spring 154, and a shaft 157 of the gripper 75 controlled by a torsion spring 156 are journalled. In rearwardly extending bearing arms 159 of the head piece 152 a rocking shaft 160 is further journalled on which the arm 86 is fixed in the end of which a roller 27 is mounted which, together with the band roller 26, serves to convey the removed sheets. The sucker shaft 155 has an arm 161 with control roller, the gripper shaft 157 having an arm 162 with control roller and the shaft 160 of the roller-arm 86 having an arm 163 with control-roller. The rollers of these control arms are controlled by catches and inclined surfaces of the control head 153.

The control arm 161 of the sucker shaft 155 is controlled by an incline 164 which is arranged on a bolt 166 fixed in an arm 165 of the control head 153. The roller of the control arm 162 of the gripper shaft 157 is guided between two extensions 167 of the control head. The roller of the control arm 163 of the shaft 160 of the roller arm 86 engages in a similar manner between two projecting cams 168 of the control head.

In the head-piece 152 a bolt 169 is adjustably fixed, on the lower end of which facing the pile a plate 170 is arranged. The bolt 169 is adjusted so that in the sucking position it rests upon the surface of the pile and the sucker 37 adopts, with regard to the pile-surface the position which is most favourable for the sucking action. As the height of the pile may vary, for instance owing to irregularities of the paper-material, the arrangement is made that the head-piece 152 adopts itself automatically together with all the devices on the same to the varying pile-height so that the sheet-removing devices are always in the same position with regard to the top-sheet. With this object in view the slide-sleeve 150, on which the head-piece on the sheet-removing devices is arranged, is submitted in the bore of the rocking arm 29 to the action of a pressure-spring 172 bearing against a shoulder of the guiding and against a shoulder of the slide-sleeve and pressing said sleeve downward until the plate 170 comes to rest upon the pile-surface and prevents the further depression of sleeve 150.

The correct adjusting of the arm 153 of the control-head with regard to the head piece 152 is ensured by a spring 172 which in the bore of the slide-sleeve 150 is pushed over the pushing rod 151 and, bearing against the shoulder of the rod, pulls this rod downward until the control-head prevents further shifting in the downward direction by butting on the slide-sleeves. In this manner variations in the position of the top-sheet are equalized.

In the hollow rocking-shaft 13, journalled in the machine-frame and on which are loosely mounted the spur-wheel 11 with the spur-wheel 11ᵃ rigid with the same and designed to drive shaft 62 and with the cam-disk 65 rigid with spur-wheel 11 and the two-armed lever 70 for driving the rocking shaft 14, the pairwise arranged levers 29 with the sheet-lifting-devices are mounted so that they can be shifted in longitudinal direction but not rotate around said shaft. For shifting the two levers 29 together on the hollow shaft 13 in inward and outward direction, a spindle 173, rotatably mounted in the hollow shaft is provided which has on one of its ends a crank-handle 174. In a longitudinal slot of the hollow shaft 13 a slide-block 176 is guided which is mounted in an inner cavity of the extended hub 177 of lever 29 and adjustably fixed by means of screws 178.

On the inner side of the sliding-piece 176 facing the spindle 173 female threads are cut which engage with the screw-threads of the spindle. The spindle has on its one half right hand thread and on its other half left hand thread so that, when the spindle is rotated by the crank-handle 174, both levers 29 are shifted simultaneously and uniformly on the hollow-shaft 13 in inward or outward direction.

The removing of a sheet from the pile takes place in the following manner:—

After the levers 29 with all the mechanisms arranged on the same have been oscillated into the rearward position, the cams 61 and 61ᵃ permit, through the intermediary of the two levers 58 and 58ᵃ, the simultaneous descending movement of the sleeve 150 and of the bolt 15 and consequently also of the head-piece 152 with the control-head resting upon it. This descending movement stops when the plate 170 comes to rest upon the surface of the pile, this taking place sooner or later according to the height of the pile. When, the pile being higher, the descending of the slide 150, 151 terminates sooner, the rollers of the levers 58 and 58ᵃ are lifted more off the corresponding cam-disk 61 and 61ᵃ. When the pile is undulated or when the one side of the same is not of the same height as the other side, the distance of the suckers from the surface of the sheet to be removed will nevertheless always be uniform as each sucker is stopped individually independently of the other suckers according to the prevailing conditions the one sooner and the other later.

Figs. 13 to 15 illustrate the position of the sheet-removing device after the plate 170 has come into contact with the pile. The sucker 37 is close to the edge of the sheet while the gripper 75 is pulled back. In this position the sheet-corners are sucked on. The sucking conduit 179 coming from the pump is connected to a tubular piece 180 fixed in the lever 29, the other end of said tubular piece being connected by a hose 181 to the sucker.

The two cam-disks 61 and 61ᵃ come sooner or later into contact with the rollers of the levers 58 and 58ᵃ and raise simultaneously the slide-sleeve 150 and the slide-rod 151. The corners of the sucked on top-sheet are on this occasion lifted off the pile. When the head-piece 152 of the slide-sleeve 150 has arrived at the highest position, the slide rod 151 with the control-head continues along the movement.

At this continuing movement the sucker-shaft 155 is oscillated by the curved groove 164 of bolt 166 (Fig. 16) so that the sucker 37 assumes the position shown in Fig. 17. The gripper-shaft 157 is oscillated at the same time by the projecting cams 167 so that the gripper presses the sheet onto the sucker. With the gripper a blower 182 is rigidly connected from which at the same time an air-current is blown between the raised corners of the sheet and the pile. The blowing air flows in through a bore 183 in the bearing body of the gripper and blower-shaft which forms the continuation of a bore 184 of the head-piece 152. The blower-hose is connected to the bore 184.

At the end of the upward movement of the control head 153 the corner of the sheet is bent upward and further clamped on the sucker-element by the gripper. The suction-air is then shut off, and the cam 65 begins to act and cause, through the levers 67, 69, 70, an oscillating movement of one lever 29, this movement being transmitted by the hollow-shaft 13 upon the other lever 29. The sheet is thereby pulled from the pile in forward direction and, at the descending movement of the slide-rod 151 which is allowed by the cam 61 and caused by the spring 172, the gripper-shaft and the sucker-shaft are rotated so that the gripper oscillates backward and the sucker throws off the sheet which is no longer held and lets it drop upon the roller 26. At the same time the previously lifted roller-arm 86 is controlled by the projecting cams 168 in such a manner that the roller 27 comes into contact with the roller 26, the sheet being thus conveyed. The levers 29 then swing back, the spring 171 causing at the same time the backward movement of the slide-sleeve 150, which is allowed by the cam 61 until the plate 170 comes to rest upon the pile.

The control of the slide-sleeve 150 and of the slide-rod 151 can be effected instead by two elbow-levers and cams by one single cam and elbow-lever, the slide-rod pulling the slide-sleeve along at the correct moment by an abutment.

I claim:—

1. An apparatus for removing sheets from a pile by means of suction, comprising suction devices arranged at the sides of the pile on transversely adjustable pivoted carrier arms, and adapted to seize the front edges of the sheets, lift them and pull the sheets from the pile by a swinging movement of the arms.

2. An apparatus as specified in claim 1, with grippers on the arms, arranged to grip the front corners of the sheets when the sheets have been lifted by the suckers.

3. An apparatus as claimed in claim 1, with grippers on the arms and wherein the sucker and gripper on each arm are controlled by a slide guided in the arm and actuated by a cam disk on the axle of the arm.

4. An apparatus as claimed in claim 1 with grippers on the arms and wherein each sucker and the gripper co-acting with it are arranged on a slide guided on the arm, the said slide being actuated by a cam on the axle of the arm, and being controlled by fixed abutments on the arms.

5. An apparatus as specified in claim 1, comprising a slide, a cam controlling said slide, a second slide a pivoted arm on which said slides are guided and on which slides the sucker together with the gripper, said second mentioned slide being fixable to said pivoted arm and also capable of being coupled with said first mentioned slide.

6. An apparatus as claimed in claim 1, wherein the devices are adjustable about a vertical axis on their carrier arms.

7. Apparatus as specified in claim 1, wherein blowers whereby an air blast is directed, after the lifting of the top sheet, between this sheet and the sheet beneath it, are pivotally connected with the pivoted arms in such manner that they are laterally movable with the arms, but are otherwise immovable.

8. An apparatus for removing sheets from a pile by suction, comprising in combination suction devices, and automatic means for adapting said suction devices to the variations of the height at which the top sheet is situated and in such a manner that the suction-devices occupy always the same position with regard to the top sheet.

9. An apparatus for removing sheets from a pile by suction comprising suction devices, a vertically movable slide carrying said suction devices, and a feeler-foot on the lower end of said slide to rest on the pile of sheets and automatically adjust the slide to dispose the suction devices to always occupy the same position with respect to the top sheet.

10. An apparatus specified in claim 1, in which the suction devices are carried by a slide, a controlling element shiftable automatically with regard to the slide to adjust the suction devices with relation to the top sheet, and an abutment for limiting the shifting movement of said element in one direction.

11. An apparatus as specified in claim 1, in which the carrier arms of the suction devices are mounted with sheet grippers on a two-part slide comprising a slide carrier sleeve and a slide-control rod guided in said sleeve.

12. An apparatus as specified in claim 1, wherein the suction device carrier arms also carry sheet grippers and are mounted on a slide-sleeve, a slide-control-rod movable in said sleeve, and cams controlling said slide-sleeve and slide-rod.

13. An apparatus of the character described, comprising in combination with a suction device, a sheet gripper, a sheet advancing roller-arm carried by the gripper, a slide-rod, and means on said-slide-rod for simultaneously controlling the actions of said suction device, gripper and roller-arm.

14. An apparatus for removing sheets from a pile by suction, comprising in combination, a hollow shaft having guide slots, suction sheet removing devices, rocker levers carrying said devices and each having a hub engaging said shaft and provided with an extension, blocks guided in the slots of the hollow shaft and engaging the hub extensions of the lever, and a screw-spindle mounted in said shaft and having left hand and right hand threaded portions engaging said blocks for simultaneously and uniformly adjusting said levers with relation to each other.

In testimony whereof I affix my signature.

GEORG SPIESS.